(12) United States Patent
Troppens et al.

(10) Patent No.: US 9,246,744 B2
(45) Date of Patent: Jan. 26, 2016

(54) CONTROLLING ACCESS OF CLIENTS TO SERVICE IN CLUSTER ENVIRONMENT

(71) Applicant: International Business Machines Corporation, Armonk, NY (US)

(72) Inventors: Ulf Troppens, Mainz (DE); Erik Rueger, Mainz (DE); Michael Diederich, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 13/767,251

(22) Filed: Feb. 14, 2013

(65) Prior Publication Data

US 2013/0212264 A1  Aug. 15, 2013

(30) Foreign Application Priority Data

Feb. 14, 2012  (EP) ..................................... 12155286

(51) Int. Cl.
*G06F 15/173* (2006.01)
*H04L 29/12* (2006.01)
(Continued)

(52) U.S. Cl.
CPC ...... *H04L 29/12207* (2013.01); *H04L 61/2061* (2013.01); *H04L 69/40* (2013.01); *H04L 43/16* (2013.01); *H04L 61/1511* (2013.01)

(58) Field of Classification Search
CPC .............. H04L 29/12207; H04L 43/16; H04L 61/1511; H04L 61/2061; H04L 69/40
USPC ................... 709/202, 220–226, 217, 229–230
See application file for complete search history.

(56) References Cited

U.S. PATENT DOCUMENTS

| | | | |
|---|---|---|---|
| 6,578,158 B1 | 6/2003 | Deitz et al. | |
| 7,428,210 B2 | 9/2008 | Saika | |
| 7,467,191 B1 | 12/2008 | Wang et al. | |

(Continued)

FOREIGN PATENT DOCUMENTS

| | | |
|---|---|---|
| CN | 101340327 | 1/2009 |
| CN | 101465768 | 6/2009 |

(Continued)

OTHER PUBLICATIONS

Sung, H. et al., "Dynamic Clustering Model for High Service Availability", ISADS '07, 8th International Symposium on Autonomous Decentralized Systems, IEEE, Mar. 1, 2007, pp. 311-317.

(Continued)

*Primary Examiner* — Chirag R Patel
*Assistant Examiner* — Anh Nguyen
(74) *Attorney, Agent, or Firm* — Feb Cabrasawan (57) ABSTRACT

First, second, and third sets of addresses are created. The first set includes addresses registered in a name server; both the second and third sets include addresses not registered in the name server and that are disjoint. A first address of a first server that has failed and to which access is to be prohibited is moved from the first to the third set, is removed from the first server, assigned to a second server, and removed from the name server. Usage parameter values of the first address are monitored to determine whether at least one is below a value. If so, the first address is removed from the second server and moved from the third to the second set. Upon access to the first server no longer being prohibited, a second address of the second set is assigned to the first server and added to the name server.

15 Claims, 2 Drawing Sheets

(51) Int. Cl.
*H04L 29/14* (2006.01)
*H04L 12/26* (2006.01)

(56) References Cited

U.S. PATENT DOCUMENTS

| | | | |
|---|---|---|---|
| 7,814,065 B2 | 10/2010 | Chan et al. | |
| 7,818,408 B1 * | 10/2010 | Ignatuk et al. | 709/221 |
| 8,495,190 B2 * | 7/2013 | Andrews et al. | 709/223 |
| 8,612,564 B2 * | 12/2013 | Swildens et al. | 709/223 |
| 2006/0271814 A1 | 11/2006 | Fung et al. | |
| 2007/0019540 A1 * | 1/2007 | Biswas et al. | 370/217 |
| 2007/0220302 A1 | 9/2007 | Cline et al. | |
| 2009/0024869 A1 | 1/2009 | Kitamura et al. | |
| 2009/0177720 A1 | 7/2009 | Shitomi et al. | |
| 2010/0198979 A1 * | 8/2010 | Pickens et al. | 709/231 |

FOREIGN PATENT DOCUMENTS

| | | | |
|---|---|---|---|
| CN | 102308536 | 1/2012 | |
| CN | 104137085 | 11/2014 | |
| EP | 2815323 | 12/2014 | |
| JP | 2004326667 A * | 11/2008 | G06F 11/20 |
| WO | 2010023330 A1 | 3/2010 | |
| WO | 2013121255 A1 | 8/2013 | |

OTHER PUBLICATIONS

Singh, et al. "Failover, load sharing and server architecture in SIP telephony", Computer Communications, Elsevier Science Publishers, Amsterdam, NL, vol. 30, No. 5, Feb. 20, 2007, pp. 927-942.

JH Software APS: "DNS Caching and Simple Failover", Nov. 14, 2006, web <http://www.simplefailover.com/outbox/dns-caching.pdf>, 13 pp.

Tseng, J. et al., "Internet Storage Name Service (iSNS)", JCT-VC Meeting, Network Working Group, Request for Comments: 4171, Internet Engineering Task Force, Sep. 19, 2005, 141 pp.

Extended European Search Report for Application No. 12868707.6 dated Nov. 5, 2015, 7 pp.

* cited by examiner

Fig. 1

CONTROLLING ACCESS OF CLIENTS TO SERVICE IN CLUSTER ENVIRONMENT

RELATED APPLICATIONS

The present patent application claims priority under 35 USC 119 to the previously filed European patent application, filed on Feb. 14, 2012, and assigned EP patent application number 12155286.3.

BACKGROUND

Cluster systems provide convenient platforms for executing various types of complex applications. A cluster system includes multiple servers combined in a unified system through software and networking. The servers provide services, such as storage services, via external networks to one or more external devices.

SUMMARY

An example method of the disclosure is for controlling access of clients to a service provided by each of a number of servers. The method is performable by an addresses pool controller operably coupled to a name server for controlling client access to the servers. The method includes creating a first set of addresses, a second set of addresses, and a third set of addresses. The first set of addresses includes addresses that are registered in the name server, the second set of addresses includes addresses that are not registered in the name server, and the third set of addresses includes addresses not registered in the name server. The second and the third sets of addresses are disjoint.

The method includes determining a first server of the servers as a server that has failed and to which the access is to be prohibited. The first server is associated with a first address of the first set of addresses. The method includes moving the first address from the first set of addresses to the third set of addresses. The method includes removing the first address from the first server and assigning the first address to a second server of the servers. The method includes removing the first address from the name server, and monitoring one or more usage parameter values of the first address.

The method includes evaluating the one or more monitored usage parameter values to yield a determination as to whether at least one of the monitored one or more usage parameter values is below a minimum usage threshold value. The method includes removing the first address from the second server and moving the first address from the third set of addresses to the second set of addresses if the determination indicates that the at least one of the usage parameter values is below the minimum usage threshold value. The method includes determining that access to the first server is no longer to be prohibited, assigning a second address of the second set of addresses to the first server, and adding the second address to the name server, to permit fail-back of the first server.

An example computer-readable medium of the disclosures has computer-readable instructions stored thereon that, when executed by a processor, cause the processor to perform a method for controlling access of a plurality of clients to a service provided by each of a number of servers. The method includes creating a first set of addresses, a second set of addresses, and a third set of addresses. The first set of addresses includes addresses that are registered in a name server, the second set of addresses includes addresses that are not registered in the name server, and the third set of addresses includes addresses not registered in the name server. The second and the third sets of addresses are disjoint. The method includes determining a first server of the servers as a server that has failed and to which the access is to be prohibited. The first server is associated with a first address of the first set of addresses. The method includes moving the first address from the first set of addresses to the third set of addresses, removing the first address from the first server and assigning the first address to a second server of the servers, and removing the first address from the name server.

An example apparatus of the disclosure includes networking hardware to operably couple to a name server, a processor, and a computer-readable data storage medium storing processor-executable instructions performable by the processor. The instructions when performed by the processor cause the processor create a first set of addresses, a second set of addresses, and a third set of addresses. The first set includes addresses registered in the name server, each of the second set and the third set includes addresses not registered in the name server, and the second and the third sets of addresses are disjoint. The instructions when performed by the processor further cause the processor to move a first address of a first server that has failed and to which access is to be prohibited from the first set to the third set, remove the first address from the first server and assign the first address to a second server, and remove the first address from the name server. The instructions when performed by the processor further cause the processor to in response to a condition being satisfied, remove the first address from the second server, and move the first address from the third set to the second set, and upon which the access to the server no longer being prohibited, assign a second address of the second set to the first set, and add the second address to the name server.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure. In the detailed description, like numbered elements in the figures are either similar elements or perform an equivalent function. Elements that have been discussed previously will not necessarily be discussed in later figures if the function is equivalent.

As described in the background section, cluster systems are advantageous. However, although cluster systems provide a number of advantages, they experience some limitations. One limitation is related to their availability. In particular, a server of a cluster system may require repair while the server is processing a request from an external device. The need of the repair may be due to a failure of the server, or software hosted by the server may need an update.

Existing clustering technologies can build a highly available solution. Generally, if one server of a cluster fails, an active server continues the service and thus the failure of the server does not cause an outage for a client on the external device. Two approaches are commonly used. In the first approach, a domain name system (DNS) server contains an Internet protocol (IP) address of the server. Once this server fails, the active server changes a DNS entry on the DNS server so that by a new DNS name look up a request of the external device is redirected to the IP address of the active server. The problem of this approach is that the client on the external device usually caches the DNS entries and tries to reconnect to the failed server. This results in a timeout of the reconnect. The second approach is an IP switching approach. The IP address of the failed server is activated on the active server. The problem on this approach is that when the IP address is reassigned to the server, after being repaired, the external device is disconnected.

Techniques disclosed herein provide for an improved computer-implemented method, data processing system and corresponding computer-readable storage medium for controlling access of clients to a service. Such techniques can be advantageous, because they reduce the number of input/output (I/O) request failures that usually happen in a cluster of servers. These failures may happen due to a failure of a server of the cluster. For example, in case the prohibiting access is triggered by a failure of the first server, there will be no I/O request failure once the fail-back is enabled. This is in contrast to conventional IP switching techniques. In these techniques, the fail-back is performed by moving the address from a second server to a first server, which causes an I/O request failure. Another advantage is that a client of an external device that caches the address of the first server before the first server fails and tries to reconnect to the failed server using that address will be serviced by the second server. This is not the case with conventional methods in which the reconnect results in a timeout. These advantages allow for a higher availability of the cluster environment.

The techniques disclosed herein can be used with multiple name servers, such as DNS servers, fiber channel name servers, or Internet storage name service (iSNSs). This allows for flexibility of building cluster systems. The techniques disclosed herein can be advantageous because they protect client processes running on a first server against a failure of the first server or any incident that may prohibit the access of the client to the first server. These processes can be run on a second server.

Figure 1:
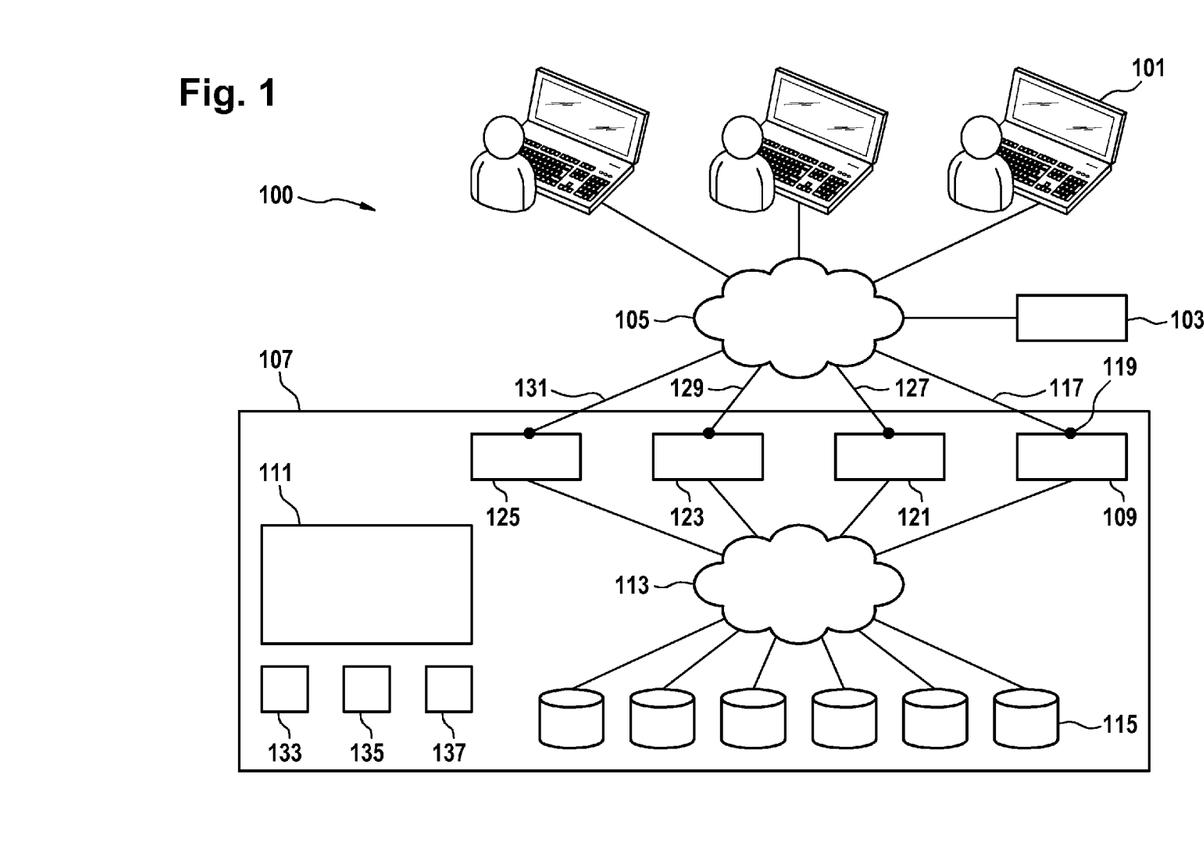
FIG. 1 is a diagram of an example system architecture for the execution of a method for controlling access of clients to a service in a cluster environment.

Referring now to the figures, FIG. 1 depicts an example system architecture 100 operable to execute a process for controlling access of a number of clients to a service being provided by each one of a number of servers. The system 100 includes clients 101. The client 101 may be, for example, an application server, a database server, a personal computer (PC), a laptop computer, a personal digital assistance (PDA) device, a tablet PC, or a mobile phone. The client 101 may provide user authentication, network/server access, remote display, support for input/output including keyboard, mouse, local universal serial bus (USB), and/or printing capabilities. The client 101 includes a lookup service, such as a DNS client. The clients 101 are communicatively coupled to a clustered file storage 107 via an external network 105. The external network 105 may be for, example, an IP network.

The clustered file storage 107 includes an addresses pool controller 111, which is more generally an apparatus like a device including hardware and/or software, and multiple servers 109, 121, 123 and 125. The addresses pool controller 111 controls access of the clients 101 to one of the services provided by each one of the multiple servers 109, 121, 123 and 125. Each server 109, 121, 123 and 125 can perform any server function such as, for example, a data server, an application server or a web server function. Each server 109, 121, 123 and 125 is assigned with one or more addresses 117, 127, 129 and 131. The address 117, 127, 129 and 131 may be, for example, an IP address, a fiber channel address, or a universal resource locator (URL) address.

The servers 109, 121, 123 and 125 have access to an internal storage capacity 115. The internal storage capacity may be part of the servers 109, 121, 123 and 125 or part of the clustered file storage 107 accessible by the servers 109, 121, 123 and 125 via an internal network 113. The internal network 113 may be, for example, a non-IP messaging protocol network, an Ethernet network, or an InfiniBand network. The internal storage capacity 115 may include one or more interconnected storage devices, such as disk drives, tape cartridges, solid-state disks (SSDs), or non-volatile random-access memory (RAM) modules.

When the client 101 requests a service such as an I/O request, the lookup service contacts a name server 103 to look-up one address for providing that service. The name server 103 may be, for example, a DNS server. The name server 103 may fulfill the lookup service request by responding an address 117, 127, 129 and 131. To issue the I/O requests, the client 101 connects, via an access point 119, to the server 109, 121, 123 and 125 that has the address 117, 127, 129 and 131 assigned. The server 109, 121, 123 and 125 enables and manages the I/O requests, and translates these requests into requests to the internal storage capacity 115 to retrieve and store information.

The addresses pool controller 111 manages three sets of addresses 133, 135 and 137. The first set of addresses 133 includes addresses that are registered in the name server 103. The second set of addresses includes addresses that are not registered in the name server 103. The third set of addresses also includes addresses that are not registered in the name server. The second and the third set of addresses are disjoint. The operation of the system 100 is now described in more detail with reference to FIG. 2.

Figure 2:
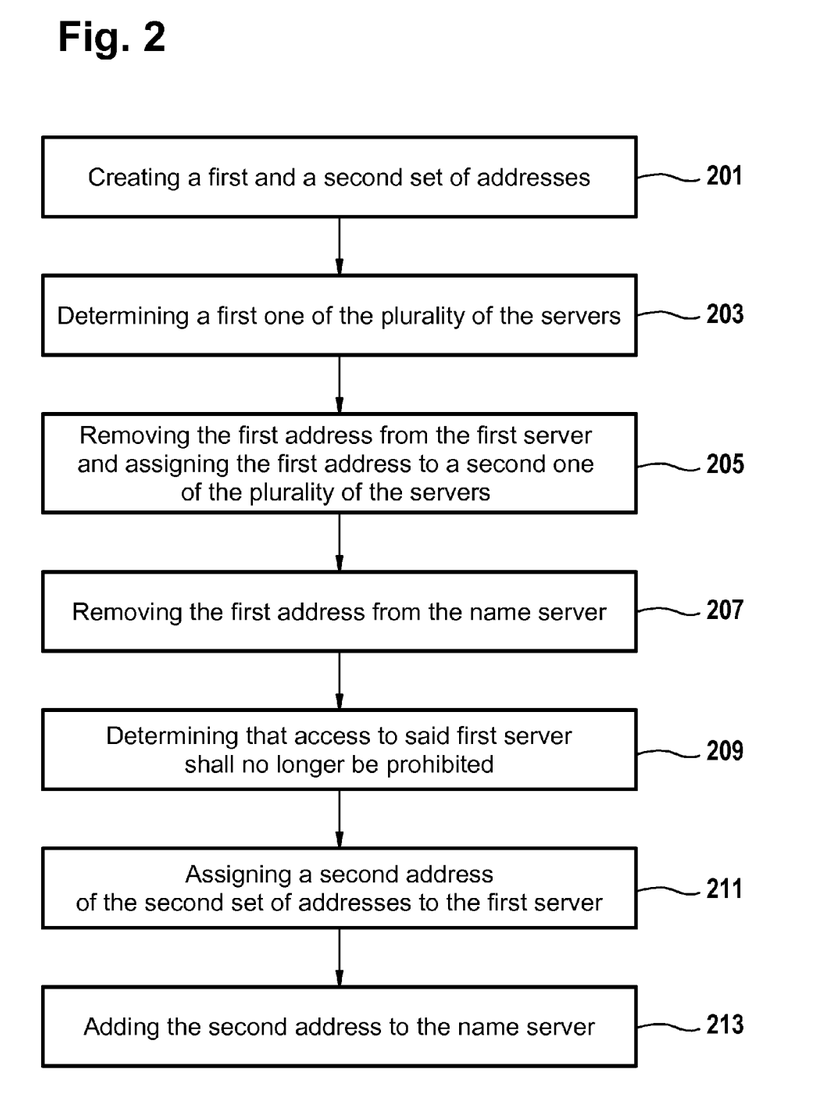
FIG. 2 is a flowchart of an example method for controlling for controlling access of clients to a service in a cluster environment.

FIG. 2 shows an example method for controlling access of clients to a service. The flowchart of FIG. 2 depicts the general methodology of this example method. The service is provided by each one of the servers 109, 121, 123 and 125. In 201, the addresses pool controller 111 creates a first, a second and a third set of addresses. In 203, the addresses pool controller 111 determines a first one 109 of the servers as a server to which the access should be prohibited. The first server 109 is associated with a first address 117 of the first set of addresses 133. The prohibiting of the access is triggered by a failure of the first server 109. Any connection to the first address 117 that were successfully serviced by the first server 109 can no longer be serviced by the first server 109. Also, any new connection attempts to the first address will not succeed.

In 205, the addresses pool controller 111 removes the first address 117 from the first server 109 and assigns the first address to a second one 121 of the servers 121, 123 and 125. The first address 117 may still have a certain number of assigned processes. These processes are the ones that were already initiated on the first server 109 before the occurrence of the incident and/or are processes that were requested by the client after the occurrence of the incident. Typically, the client has cached the first address 117 before occurrence of the incident. The addresses pool controller 111 moves the first address 117 from the first set of addresses 133 to a third set of addresses 137. In 207, the addresses pool controller 111 removes the first address 117 from the name server 103. The third set of addresses 137 thus includes addresses that are not registered in the name server 103 and can still be used by the client.

The second server 121 or the addresses pool controller 111 monitors one or more usage parameters of the first address 117. The usage parameter may be for example the number of processes running on the second server 121 which are associated to address 117 that was originally assigned to the failed server 109. The second server 121 or the addresses pool controller 111 evaluates the one or more monitored usage parameter values. If at least one of the monitored one or more usage parameter values is below a minimum usage threshold value, the addresses pool controller 111 removes the first address 117 on the second server 121 and moves the first address 117 from the third set of addresses 137 to the second set of addresses 135. The second set of addresses 135 thus includes addresses that are available for free assignment to new servers. These addresses are not registered in the name server 103 and cannot currently be used by the client.

In the fail-back process, as soon as the first server is repaired, the addresses pool controller 111 determines, in step 209, that access to the first server 109 should no longer be prohibited. Thus, the addresses pool controller 111, in 211, assigns any second address of the second set of addresses 135 to the first server 109. This may be for example again the second address 117 or an address that was not used before. In 213 the addresses pool controller 111 adds the second address (e.g., 117) to the name server. In addition, the addresses pool controller 111 moves the second address (e.g., 117) from the second set of addresses 135 to the first set of addresses 133. The first set of addresses 133 includes addresses that are registered in the name server 103 and can be used by the client.

A method has thus been described for controlling access of clients to a service. The service is provided by each one of a number of servers. Each server provides the service, and the method is performed by an addresses pool controller. The addresses pool controller is operably coupled to a name server for controlling the access of the clients to the servers.

The method includes creating a first, a second, and a third set of addresses. The first set of addresses includes addresses that are registered in the name server, and the second set of addresses includes addresses that are not registered in the name server. The third set of addresses includes addresses not registered in the name server, where the second and the third set of addresses being disjoint.

The method includes determining a first one of the servers as a server that has failed and to which the access should be prohibited. The first server is associated with a first address of the first set of addresses. The method includes moving the first address from the first set of addresses to the third set of addresses, and removing the first address from the first server and assigning the first address to a second one of the servers. The method includes removing the first address from the name server, and monitoring one or more usage parameter values of the first address.

The method includes evaluating the one or more monitored usage parameter values for determining if at least one of the monitored one or more usage parameter values is below a minimum usage threshold value. The method includes removing the first address from the second server and moving the first address from the third set of addresses to the second set of addresses if the determination is returned that at least one of the usage parameter values is below the minimum usage threshold value. The method includes determining that access to the first server should no longer be prohibited, assigning a second address of the second set of addresses to the first server, and adding the second address to the name server, to permit a fail-back of the first server. The method can further include removing the second address from the second set of addresses and adding the second address to the first set of addresses as a further first address.

The address can be an IP address, a fiber channel address, and/or a URL address. The name server can be a DNS server, where each address of the first set of IP addresses is registered in the DNS server. Each server can be associated with at least one address, where the address is registered in the name server. The name server may receive a request for an address from one of the clients, and fulfill the request by returning the address, which is one of the addresses assigned to the servers.

The second server can hold processes assigned to the first address. The processes assigned to the first address are processes that were already initiated on the first server before the occurrence of the incident, and/or are processes being requested by a client after the occurrence of the incident. The client has cached the first address before occurrence of the incident. Determining that access to the first server should no longer be prohibited can be triggered by repairing of the first server. For example, the lifting of the incident is a result of repairing the first server being inoperable, and/or updating the installed service instance of the first server.

Furthermore, another example method can update one or more servers of a number of servers. Each server provides a service to one or more clients. The servers are operably coupled to a name server. The method can include, first, determining a first server of the servers, where the first server's installed service instance requires an update; and second, determining a starting server of the servers. The method can include, third, initiating a software update on the starting server, thus defining the starting server as a first updated server; fourth, redirecting workload of the first server to the first updated server; and fifth, defining the first server as a further starting server. The servers can be organized into load levels ordered from lowest to highest. Criteria for determining a least loaded server include the number of current outstanding I/O requests, the number of current connected clients, and the current central processing unit (CPU), random-access memory (RAM), and/or network utilization.

In the first part of this method, a controller determines a first server of the servers. It is assumed that the first server's installed service instance requires the update. The first server is associated with a first address. The first address is an IP address, a Fiber Channel Address and/or an URL. In the second part, the controller determines a starting server of the servers. The starting server is determined based on three different processes.

In a first process, the starting server is defined as a hot spare server that is not associated with any address. Thus, no clients can connect to the hot spare server. In a second process, the starting server is defined as a first least loaded server, which is associated with a second address. In addition, the second address is removed from the first least loaded server and assigned to a second least loaded server. This might cause a loss of I/O request for stateless I/O protocols and a connection abort for stateful I/O protocols.

In a third process, the starting server is defined as in the second process and in addition the second address is removed from the name server. Thus, new connections which look-up the second address on the name server will not receive the second address. However, clients might have already looked up the second address, before the second address was removed from the name server. Such clients might have already established a stateful session to the first least loaded server. These processes are terminated using a draining process. For example, once a number of connected stateful clients is below a first threshold, the second address will be moved to the second least loaded controller. For many workloads this draining process can be achieved by just waiting for a certain period of time. For instance, a file server for office documents may become client less at the end of the business hours or at the weekend, when all personal computers are shut down.

In the third part of the method, the controller initiates a software update on the starting server. The starting server is then labeled as a first updated server. In the fourth part, the controller redirects workload of the first server to the first updated server. In addition, the controller removes the first address from the first server and assigns the first address to the first updated server. This might cause a loss of I/O requests for stateless I/O protocols and a connection abort for stateful I/O protocols. Since the first address has been moved to an already updated server, there will be at most one reconnect during the update of all servers. In case the determined first server is the second least loaded server, the first address and the second address are removed from the second least loaded server and assigned to the first updated server. The first updated server is then labeled as a second updated server. In the fifth part of the method, the controller defines the first server as a further starting server.

At the end of the update of all servers, the controller, in the second process noted above, moves the first address from the second updated server to the first updated server. In the third process, the controller removes the first address of the second updated server from the name server, and monitors the workload of the first address. If a predefined threshold is reached, the controller moves the first address to the first updated server. The controller adds the first address to the name server.

As will be appreciated by one skilled in the art, aspects of the present invention may be embodied as a system, method or computer program product. Accordingly, if not explicitly stated otherwise, aspects of the present invention may take the form of an entirely hardware embodiment, an entirely software embodiment (including firmware, resident software, micro-code, etc.) or an embodiment combining software and hardware aspects that may all generally be referred to herein as a 'module' or 'system'. Any combination of one or more computer-readable medium(s) may be utilized.

As has been used herein, the term "computer-readable storage medium," as encompasses any tangible storage medium that may store instructions that are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data that can be accessed by the processor of the computing device. Examples of computer-readable storage media include, but are not limited to: a floppy disk, punched tape, punch cards, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks.

The term computer readable-storage medium also refers to various types of recording media capable of being accessed by the computer device via a network or communication link. For example data may be retrieved over a modem, over the Internet, or over a local area network. References to a computer-readable storage medium should be interpreted as potentially include multiple computer-readable storage media. Various executable components of a program or programs may be stored in different locations. The computer-readable storage medium may, for instance, include multiple computer-readable storage media within the same computer system. The computer-readable storage medium may also be computer-readable storage medium distributed amongst multiple computer systems or computing devices.

The term "computer memory" or "memory" is an example of a computer-readable storage medium. Computer memory is any memory that is accessible by a processor. Examples of computer memory include, but are not limited to: RAM memory, registers, and register files. In some instances a computer memory may also include: a hard disk drive, a floppy drive or a solid-state hard drive. For instance, part of a memory may in fact be swap space on a hard drive. References to "computer memory" or "memory" should be interpreted as potentially including multiple memories. The memory may, for instance, include multiple memories within the same computer system. The memory may also include multiple memories distributed amongst multiple computer systems or computing devices.

The term "processor" as used herein encompasses an electronic component, which is able to execute a program or machine executable instruction. References to the computing device including "a processor" should be interpreted as potentially containing more than one processor or processing core. The processor may for instance be a multi-core processor. A processor may also refer to a collection of processors within a single computer system or distributed amongst multiple computer systems.

The term "network" as used herein refers to network systems, including public and private networks that may or may not use the TCP/IP protocol suite for data transport. Examples include the Internet, Intranets, extranets, telephony networks, and other wire-line and wireless networks. The term "cluster" as used herein refers to a system having multiple networked server instances that are clustered together. Each instance in the cluster may contain its own resources such as CPU and memory, or is sharing the resources with the other instances. All instances in the cluster may communicate with each other, typically through private interconnects.

The term "name server" as used herein refers to a server containing files of network-related information, such as a mapping of host names to network IP ("Internet Protocol") addresses of all computers in the network. The name server provides such mapping information to other computers and workstations upon request. The name server may be, for example, a DNS server, a fiber channel name server, or an iSNS. The term "fail-over/fail-back" as used herein refers to redirecting traffic from a failed server to a working server and/or back to the originally failed server once this server is reactivated. The term "I/O request" as used herein refers to any input/output request, command, CRUD (copy, read, update and delete) operation, or other procedure used by an application to interact with a computer system.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method for controlling access of a plurality of clients to a service, the service provided by each of a plurality of servers, the method performable by an addresses pool controller operably coupled to a name server for controlling client access to the servers, the method comprising:

creating a first set of addresses, a second set of addresses, and a third set of addresses, where the first set of addresses comprises addresses that are registered in the name server, the second set of addresses comprises addresses that are not registered in the name server, the third set of addresses comprises addresses not registered in the name server, and the second and the third sets of addresses are disjoint;

determining a first server of the servers as a server that has failed and to which the access is to be prohibited, the first server being associated with a first address of the first set of addresses;

moving the first address from the first set of addresses to the third set of addresses;

removing the first address from the first server and assigning the first address to a second server of the servers;

removing, by the addresses pool controller implemented at least in hardware, the first address from the name server;

monitoring one or more usage parameter values of the first address;

evaluating the one or more monitored usage parameter values to yield a determination as to whether at least one of the monitored one or more usage parameter values is below a minimum usage threshold value;

removing the first address from the second server and moving the first address from the third set of addresses to the second set of addresses if the determination indicates that the at least one of the usage parameter values is below the minimum usage threshold value;

determining that access to the first server is no longer to be prohibited;

assigning a second address of the second set of addresses to the first server; and adding the second address to the name server, to permit fail-back of the first server.

2. The method of claim 1, wherein each address comprises one or more of an Internet protocol (IP) address, a fiber channel address, and a universal resource locator (URL) address.

3. The method of claim 1, wherein the name server comprises a domain name system (DNS) server, and each address of the first set of addresses is registered in the DNS server.

4. The method of claim 1, wherein each server is associated with at least one address registered in the name server.

5. The method of claim 1, further comprising removing the second address from the second set of addresses and adding the second address to the first set of addresses as a further first address.

6. The method of claim 1, wherein the second server holds processes assigned to the first address, the processes assigned to the first address being one or more of processes that were already initiated on the first server before occurrence of an incident, and processes being requested by a client after the occurrence of the incident, the client having cached the first address before the occurrence of the incident.

7. The method of claim 1, wherein determining that access to the first server is no longer to be prohibited is triggered upon repairing the first server.

8. A non-transitory computer-readable medium having computer-readable instructions stored thereon that, when executed by a processor of a controller implemented in hardware, cause the processor to perform a method for controlling access of a plurality of clients to a service, the service provided by each of a plurality of servers, the method comprising:

creating a first set of addresses, a second set of addresses, and a third set of addresses, where the first set of addresses comprises addresses that are registered in a name server, the second set of addresses comprises addresses that are not registered in the name server, the third set of addresses comprises addresses not registered in the name server, and the second and the third sets of addresses are disjoint;

determining a first server of the servers as a server that has failed and to which the access is to be prohibited, the first server being associated with a first address of the first set of addresses;

moving the first address from the first set of addresses to the third set of addresses;

removing the first address from the first server and assigning the first address to a second server of the servers;

removing, by the controller implemented at least in the hardware, the first address from the name server;

monitoring one or more usage parameter values of the first address; evaluating the one or more monitored usage parameter values to yield a determination as to whether at least one of the monitored one or more usage parameter values is below a minimum usage threshold value;

removing the first address from the second server and moving the first address from the third set of addresses to the second set of addresses if the determination indicates that the at least one of the usage parameter values is below the minimum usage threshold value;

determining that access to the first server is no longer to be prohibited; and assigning a second address of the second set of addresses to the first server; and adding the second address to the name server, to permit fail-back of the first server.

9. The computer-readable medium of claim 8, wherein the method further comprises removing the second address from the second set of addresses and adding the second address to the first set of addresses as a further first address.

10. The computer-readable medium of claim 8, wherein the second server holds processes assigned to the first address, the processes assigned to the first address being one or more of processes that were already initiated on the first server before occurrence of an incident, and processes being requested by a client after the occurrence of the incident, the client having cached the first address before the occurrence of the incident.

11. The computer-readable medium of claim 8, wherein determining that access to the first server is no longer to be prohibited is triggered upon repairing the first server.

12. An apparatus comprising:
networking hardware to operably couple to a name server;
a processor; and
a computer-readable data storage medium storing processor-executable instructions performable by the processor to:
create a first set of addresses, a second set of addresses, and a third set of addresses, the first set comprising addresses registered in the name server, each of the second set and the third set comprising addresses not registered in the name server, and the second and the third sets of addresses being disjoint;

move a first address of a first server that has failed and to which access is to be prohibited from the first set to the third set, remove the first address from the first server and assign the first address to a second server, and remove the first address from the name server;

in response to a condition being satisfied, remove, by the processor, the first address from the second server, and move the first address from the third set to the second set;

upon which the access to the server no longer being prohibited, assign a second address of the second set to the first set, and add the second address to the name server.

13. The apparatus of claim 12, wherein each address comprises one or more of an Internet protocol (IP) address, a fiber channel address, and a universal resource locator (URL) address.

14. The apparatus of claim 12, wherein each server is associated with at least one address registered in the name server.

15. The apparatus of claim 12, wherein the second server holds processes assigned to the first address, the processes assigned to the first address being one or more of processes that were already initiated on the first server before occurrence of an incident, and processes being requested by a client after the occurrence of the incident, the client having cached the first address before the occurrence of the incident.

* * * * *